(12) United States Patent
Goetzelmann et al.

(10) Patent No.: US 12,291,144 B2
(45) Date of Patent: May 6, 2025

(54) VEHICLE ILLUMINATION DEVICE WITH EDGE-LIT LIGHT GUIDE AND COLORED MASK

(71) Applicant: Magna Exteriors GmbH, Sailauf (DE)

(72) Inventors: Johannes Goetzelmann, Altertheim (DE); Klaus Muenker, Griesstaett (DE); Michael Wurster, Esslingen (DE); Tobias Weyer, Cologne (DE)

(73) Assignee: Magna Exteriors GmbH, Sailauf (DE)

( * ) Notice: Subject to any disclaimer, the term of this patent is extended or adjusted under 35 U.S.C. 154(b) by 0 days.

(21) Appl. No.: 18/370,455

(22) Filed: Sep. 20, 2023

(65) Prior Publication Data

US 2024/0101022 A1    Mar. 28, 2024

(30) Foreign Application Priority Data

Sep. 28, 2022   (DE) .............................. 102022210250

(51) Int. Cl.
| | |
|---|---|
| *B60Q 1/26* | (2006.01) |
| *B32B 27/08* | (2006.01) |
| *B32B 27/30* | (2006.01) |
| *B32B 27/36* | (2006.01) |
| *B60R 13/04* | (2006.01) |
| *F21S 43/249* | (2018.01) |

(52) U.S. Cl.
CPC ................ *B60Q 1/26* (2013.01); *B32B 27/08* (2013.01); *B32B 27/308* (2013.01); *B32B 27/365* (2013.01); *B60R 13/04* (2013.01); *F21S 43/249* (2018.01); *B32B 2250/02* (2013.01); *B32B 2250/24* (2013.01); *B32B 2255/10* (2013.01); *B32B 2307/4023* (2013.01); *B32B 2307/41* (2013.01); *B32B 2307/412* (2013.01); *B32B 2605/08* (2013.01)

(58) Field of Classification Search
CPC .... F21S 43/249; F21S 43/235; B60Q 1/2607; B60Q 1/2615; B60Q 1/26; G02B 6/0041; G02B 6/0001; G02B 6/0073
See application file for complete search history.

(56) References Cited

U.S. PATENT DOCUMENTS

| | | | | |
|---|---|---|---|---|
| 4,929,866 | A | * | 5/1990 | Murata ................ G02B 6/0036 362/310 |
| 5,101,325 | A | * | 3/1992 | Davenport ............ F21S 43/251 362/489 |
| 5,386,347 | A | * | 1/1995 | Matsumoto .......... G02B 6/0036 362/23.15 |

(Continued)

FOREIGN PATENT DOCUMENTS

| | | |
|---|---|---|
| CN | 109611788 A | 4/2019 |
| DE | 102018211457 A1 | 1/2020 |

(Continued)

*Primary Examiner* — Ismael Negron
(74) *Attorney, Agent, or Firm* — Dickinson Wright PLLC

(57) ABSTRACT

An illumination for a motor vehicle includes a light-guide, a housing element, and a light source. The light-guide is arranged in the housing, with the light source arranged to project light into a side face of the light-guide. An air gap is formed between a colored coating, provided in an inner bottom surface of the housing, and the light-guide. The light-guide might include a portion covering the light source, and including an additional colored coating.

19 Claims, 2 Drawing Sheets

(56) References Cited

U.S. PATENT DOCUMENTS

Figure 1:
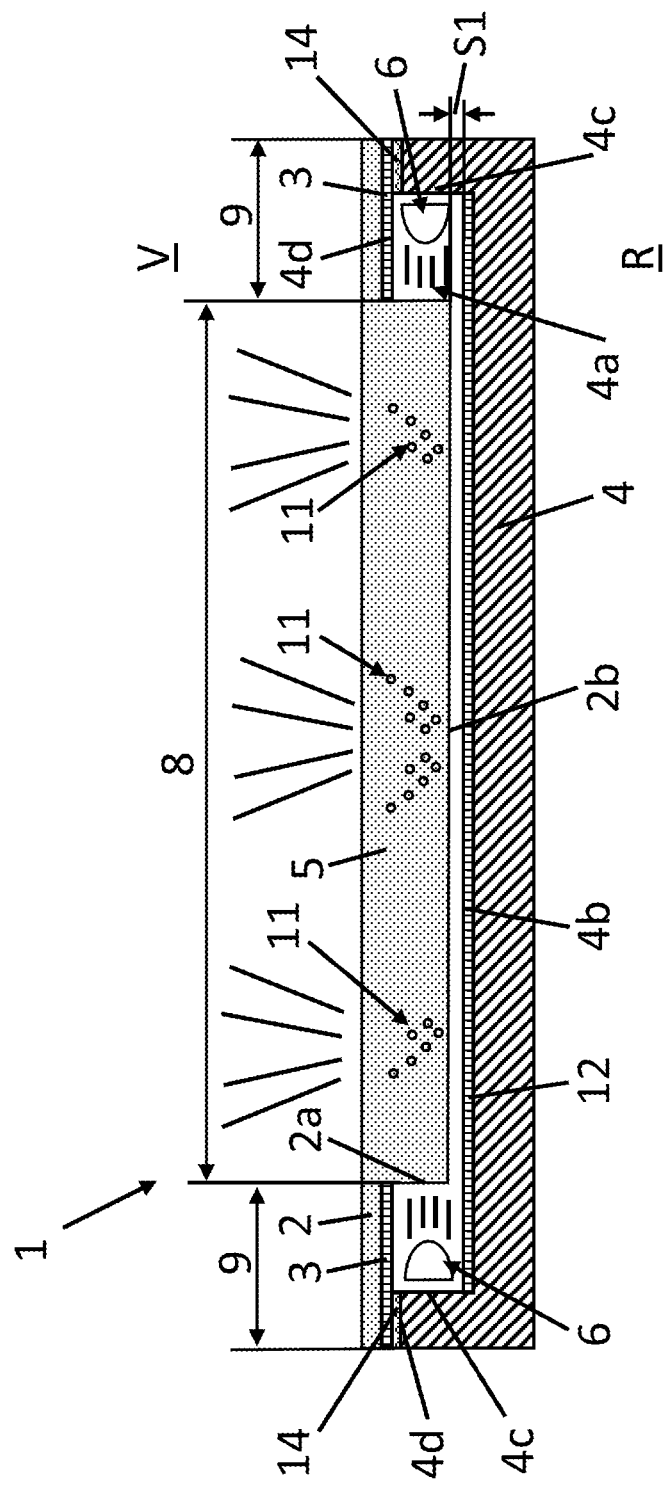

| Patent No. | | Date | Inventor | Class |
|---|---|---|---|---|
| 6,880,960 | B2* | 4/2005 | Mishimagi | B60R 1/1207 362/548 |
| 7,604,387 | B2* | 10/2009 | Liu | G02B 6/0046 362/621 |
| 7,901,125 | B2* | 3/2011 | Iwasaki | G02B 6/0078 362/628 |
| 8,545,048 | B2* | 10/2013 | Kang | G09F 13/18 362/346 |
| 8,585,270 | B2* | 11/2013 | Nakada | F21S 43/247 362/602 |
| 8,944,655 | B2* | 2/2015 | Verrat-Debailleul | G02B 6/0091 362/545 |
| 8,950,915 | B2* | 2/2015 | Natsume | F21S 43/31 362/555 |
| 9,016,918 | B2* | 4/2015 | Mueller | B60Q 3/745 362/602 |
| 9,109,773 | B2* | 8/2015 | Massault | F21S 43/30 |
| 9,169,984 | B2* | 10/2015 | Takada | F21S 43/247 |
| 9,731,649 | B2* | 8/2017 | Gocke | B60Q 1/381 |
| 10,072,811 | B2* | 9/2018 | Albou | F21S 43/249 |
| 10,300,836 | B2* | 5/2019 | Chae | F21S 41/141 |
| 10,676,019 | B2* | 6/2020 | Chen | G02B 6/009 |
| 10,711,970 | B2* | 7/2020 | Noh | F21S 43/243 |
| 10,876,703 | B2* | 12/2020 | Sakashita | F21S 43/245 |
| 2002/0043012 | A1 | 4/2002 | Shibata et al. | |
| 2006/0269213 | A1* | 11/2006 | Hwang | G02B 6/0036 385/146 |
| 2008/0066355 | A1 | 3/2008 | Misawa et al. | |
| 2010/0132232 | A1* | 6/2010 | Frisch | G02B 6/0041 40/208 |
| 2016/0011362 | A1* | 1/2016 | Jeng | G02B 6/006 362/606 |

FOREIGN PATENT DOCUMENTS

| | | |
|---|---|---|
| DE | 102018009248 A1 | 5/2020 |
| EP | 3376098 A1 | 9/2018 |
| FR | 3128770 A1 | 5/2023 |
| JP | 2019169241 A | 10/2019 |
| WO | 2005025275 A1 | 3/2005 |
| WO | 2019223989 A | 11/2019 |
| WO | 2019223989 A1 | 11/2019 |
| WO | 2022172783 A1 | 8/2022 |

* cited by examiner

VEHICLE ILLUMINATION DEVICE WITH EDGE-LIT LIGHT GUIDE AND COLORED MASK

CROSS-REFERENCE TO RELATED APPLICATIONS

This application claims priority to German Application No. DE 102022210250.9 filed on Sep. 28, 2022. The entire disclosure of the above application is incorporated herein by reference.

FIELD OF THE INVENTION

The invention relates to an illumination system for an external cladding part of a motor vehicle, the external cladding part being in particular a front module.

BACKGROUND OF THE INVENTION

This section provides information related to the present disclosure which is not necessarily prior art.

Owing to the increasing spread of electric vehicles, the requirements placed on front panels are changing since radiator inlet openings are not required to the same extent as for conventional motor vehicles equipped with internal combustion engines.

Front panels in electric vehicles are increasingly being provided with closed radiator claddings, which corresponds to better aerodynamics of the vehicle together with less requirement for cooling air.

Front panels may be manufactured from a transparent polycarbonate and provided with suitable decoration elements or functional elements, for example illumination modules. For this purpose, the front panels are produced according to the prior art by a two-component injection-moulding method. The rear side, that is to say the vehicle inner side of the three-dimensionally shaped front panel, is subsequently painted, while the front side, that is to say the outer side of the vehicle, needs to be protected against paint spray. To this end, the front side is masked. In order to produce multi-coloured structures, impressed geometries of the front panel are exposed using a laser. The inner side is subsequently coated by a physical vapour deposition method (PVD) in order to obtain a chrome effect together with light transparency. A hard paint coating is applied to the front side.

It is furthermore known to integrate separate components in the form of design elements, for example brand symbols, into the front panels. The components may be decorated with a chrome film and subsequently fitted into corresponding recesses of the moulded plastic parts painted with the colouration of the paint of the motor vehicle.

These decorated components, for example brand symbols, may be illuminated from the rear side by the use of light-transmitting materials and therefore form a decorative illumination function. However, such known cladding elements with integrated light functions have the disadvantage that the illumination is visible to a user even in the unilluminated state and is only decorative, and does not provide functional illumination.

SUMMARY OF THE INVENTION

This section provides a general summary of the disclosure, and is not a comprehensive disclosure of its full scope or all of its features.

It is an object of the invention to provide an illumination system for an external cladding part having a coloured visible side, the colour preferably being the body colour, for a motor vehicle, wherein at least in a first state it imparts a visually uniform configuration to a user as seen from the outer side of the motor vehicle and a three-dimensional characteristic feature is not visible, and wherein in a second state the three-dimensional characteristic feature is visible as seen from the outer side and the visible side is furthermore perceptible as a uniformly coloured surface overall.

The object is achieved by an illumination system for an external cladding part comprising:
- a configuration region having a visible side facing towards the outer side and a rear side with a rear-side face as well as side faces, the configuration region being formed as a light-guide body from a transparent thermoplastic material which is suitable for laser engraving, for example a PMMA, the configuration region forming a light window and being processed by means of a laser structure on the rear-side face or by means of local structures inside the configuration region for individual adaptation of the vehicle and/or for the representation of a characteristic feature appearing three-dimensionally on the visible side;
- a housing element having a trough-shaped recess with a bottom face and side faces, the bottom face being provided with a colouring coating,
- wherein the configuration region is attached to the housing element in such a way that the configuration region is enclosed at least by a rear-side section of the recess and an air gap remains between the rear-side face of the configuration region and the bottom face, and that an installation space remains between at least one side face of the configuration region and a side face of the housing element; and
- at least one light source arranged in the at least one installation space, the light source being couplable into at least one side face of the configuration region and being couplable out in the further beam path at the laser structure, and subsequently shining through the configuration region on the outer side in order to generate the three-dimensional characteristic feature,
- wherein the at least one light source is covered or coverable in the installation space by a colouring coating.

By virtue of the illumination system according to the invention of an external cladding part, it is possible to produce a configuration region having at least one three-dimensionally appearing characteristic feature with a "secret until lit" function. This means that in a first state this characteristic feature is not visible to a user and the user has the impression of a uniformly coloured external cladding part. In a second state, the three-dimensionally appearing characteristic feature is visible to a user from the outer side. In this second state, the user perceives the configuration region on the visible side with the three-dimensionally appearing characteristic feature of the vehicle manufacturer and/or decorative and/or informative elements such as at least one symbol, a number, an image, a brand symbol together with the colouring coating as a background.

This uniform appearance of the visible side, that is to say the colouring coating, may be produced by painting or a paint film. The colouring coating is opaque.

By virtue of the illumination system according to the invention, it is possible to provide the user of a motor vehicle and/or a road user at least temporarily with different illuminated features. These features may involve both safety-relevant aspects and possibilities for communication by illuminated symbols or lettering. The features may also involve design features. In this way, an extension of the functional possibilities of illuminated front panels is achieved. For example, the indicator light function may be envisaged as a further integratable function.

An advantage in this case is the cover layer or cover element, forming the front side uniformly of the external cladding element, which as a transparent moulded plastic part comprises or covers the light window and the configuration region so that there are no seams in the surface region of the illumination system in the installed situation on the cladding part. In this way, in particular, sealing problems in the integration of the illuminated features are avoided.

In a particularly preferred embodiment, the colouring coating of the opaque region of the cover element is in this case the same colour as the colouring coating of the housing element, this colour corresponding to the body colour of the motor vehicle.

The outer side or visible side is considered to be the surface region visible to a user from the external surroundings. The inner side is correspondingly the opposite side from the outer side, facing towards the inner side.

A cladding part illuminable in transmission is considered in particular to be an external cladding part, for example a front panel, a bumper cladding, a boot lid cladding, a door cladding, a roof cladding or a spoiler, or a component of one of the aforementioned parts.

The external cladding part is three-dimensionally designed.

The illumination function is produced by at least one light source. One or more LEDs may be used as the at least one light source. The light source or light sources are respectively arranged behind the intended visible side in the region of the opaque section of the cover element, or of the cover layer.

The at least one light source is in this case arranged in such a way that it couples its light laterally into a light input coupling region of the configuration element, which acts as a light-guide body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
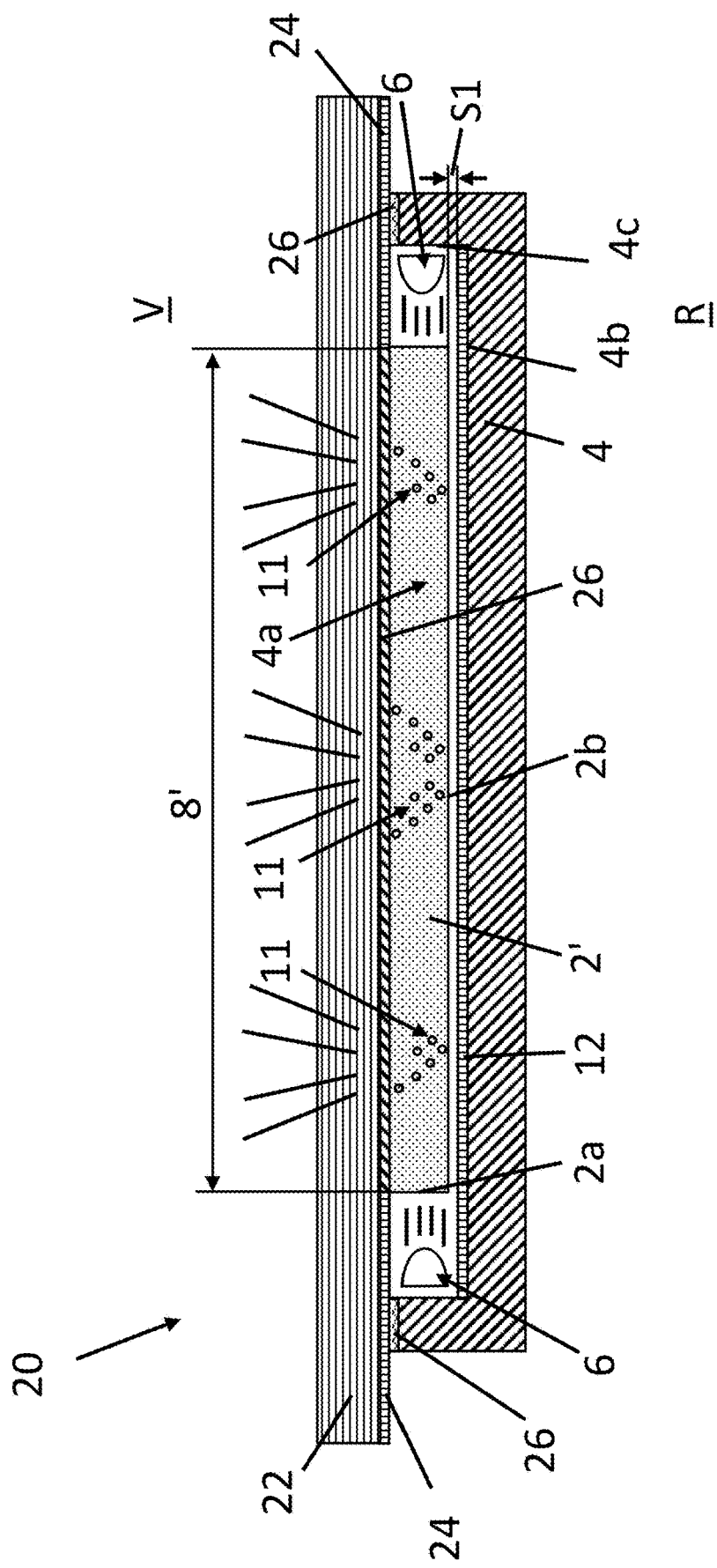

FIG. 1 shows a sectional image of a structure of an illumination system in a first embodiment; and FIG. 2 shows a sectional image of a structure of an illumination system in a second embodiment.

DESCRIPTION OF THE INVENTION

The illumination system according to the invention for an external cladding part of a motor vehicle is described below with the aid of an illumination system of a front panel as an external cladding part in the front region of an electric vehicle. Of course, such an external cladding part may also be used as a cladding element at any other desired place on a motor vehicle. The external cladding part may preferably also be a bumper cladding, a boot lid cladding, a door cladding, a roof cladding or a spoiler, or is a component of one of the aforementioned parts.

An illumination system 1 of the external cladding part is shown in the drawings in a schematic sectional representation and has a front side (V) and a rear side (R). The front side V is the visible side of the outer shell of the motor vehicle in the intended installation situation on the motor vehicle and is visible to a user.

The illumination system 1 generally includes a configuration region 2, a housing element 4 and at least one light source, also referred to as lighting means 6.

In the embodiment shown in FIG. 1, the configuration region 2 is designed as a cover element 5 which has a transparent or translucent light window 8 and at least one opaque section 9 having a colouring coating, or is designed to be colouring.

The cover element 5 is formed as a composite plastic component and comprises a deep-drawn three-dimensionally designed decoration carrier 3 and at least one externally arranged transparent cover layer. The decoration carrier 3 is a plastic film, in particular a transparent plastic film, which has a coloured coating/painting. The painting corresponds in terms of colouration to the painting of the motor vehicle. The painting or coating is not provided in the region which forms the light window 8.

Alternatively, the decoration carrier 3 may be a coloured paint film, with the light-transmitting region being produced as stamping of the decoration carrier 3.

The film as the decoration carrier 3 is back-injection-moulded with a transparent polymer material by an injection-moulding method. In the embodiment shown in FIG. 1, the transparent polymer material is a polymethyl methacrylate (PMMA). In the region of the light-transmitting region of the decoration carrier 3, the light window 8 is correspondingly formed in the cover element. The transparent cover layer forms the front side of the cover element.

As may be seen in FIG. 1 for the first exemplary embodiment, the configuration region 2, which is likewise moulded on during the injection-moulding method, is formed on the cover element in the region of the transparent light window 8. The aforementioned material used is a synthetic, hyaloid thermoplastic which is hot-formable. This plastic is ideally suited for laser cutting and engraving with CO2 lasers.

The configuration region 2 comprises side walls 2a and a rear-side face 2b. The rear-side face 2b is treated with the aid of a laser. During the laser engraving of acrylic/PMMA/PC, the surface is ablated with the aid of the laser to form an external engraving. Even very fine details may thus be represented accurately by laser engraving on acrylic. The result on pellucid acrylic is matt-white engraving, which may be used to represent a characteristic feature of the vehicle manufacturer and/or decorative and/or informative elements such as at least one symbol, a number, an image, a brand symbol, for example a logo.

In a further embodiment, the interior of the configuration region 2 is formed with local structures 11 in the region of the light window 8. These local structures 11, represented by small circles in FIG. 1, serve to display a characteristic feature of the vehicle manufacturer and/or decorative and/or informative elements such as at least a symbol, a sign, an image, a brand symbol, for example a logo, should the configuration region in the form of a light-guide body be illuminated. The local structures 11 in the interior are likewise produced by means of laser-induced material modification.

The local structures or engraving 11 by means of a laser generates a three-dimensional structure in the form of external engraving, but this does not modify the front side and smooth outer shell of the cover in the region of the light window 8. The structure therefore remains protected against wear, and the surface on the front side remains smooth and unprocessed. The term unprocessed in this context indicates only that the surface on the front side of the cover element is not structured by a laser. The surface remains smooth and merely follows a predetermined contour, if required.

The illumination system 1 furthermore comprises the housing element 4, which has a trough-shaped recess 4a with a bottom face 4b and side walls 4c. The bottom face 4b and the side walls 4c delimit the recess, which is open upwards. The bottom face 4b furthermore has end faces 4d directed towards the front side.

The housing element 4 is designed with a colouring coating 12 at least in the region of the bottom face. The colouring coating 12 corresponds in terms of colour to the colouring coating 12 of the cover element and is preferably the body colour of the motor vehicle (the colour code of the colouring coatings is the same as the colour code of the car paint). The housing element 4 is produced from a thermoplastic material such as a polycarbonate (PC) or acrylonitrile butadiene styrene (ABS). The colour coating is produced by conventional methods such as a coating method or a film lamination method.

As may be seen from the sectional representation, the cover element 5 is placed on the housing element 4 in such a way that the configuration region 2 projects with its height-wise extent fully into the trough-shaped recess 4a and is enclosed by all side walls 4c of the housing element 4. The cover element 5 is held fixed on the end sides 4d of the housing element 4 by means of an adhesive bond 14, for instance an adhesive tape.

An air gap S1 in this case remains between the rear-side face 2b of the configuration region 2 and the bottom face 4b of the housing element.

An installation space likewise remains between two side walls 2a of the configuration region and the respectively correspondingly opposite side walls 4c of the housing element 4.

In order to make the above-described structure of the configuration region visible from the outer side, illumination is provided. As may be seen in FIG. 1, at least one lighting means 6 is arranged in each installation space. The lighting means 6 are in this case arranged with an alignment such that the emitted light is coupled into the side walls 2a, or into input coupling faces of the side walls of the configuration region 2, which serves as a light-guide body. The light thereby coupled into the configuration region 2 is coupled out and directed further on at the previously processed structured rear-side face 2b, and emitted through the configuration region 2 and the light window 8 towards the outer side, so that the characteristic feature is visible on the outer side in the region of the light window 8. The light rays are symbolically represented by the lines.

The characteristic feature may also comprise illuminated symbols, letters, characters, brand emblems, which appear and are visible from the outer side in the second state.

As may furthermore be seen from the schematic representation of FIG. 1, the lighting means 6 are arranged in the laterally represented installation spaces so as to be concealed as seen from the outer side by the colouring coating of the cover element 5. The illumination system 1 is furthermore dimensioned and designed in such a way that the bottom face 4b of the housing element 4 is provided with the same colouring coating over the entire width and fully covers the light window 8 and at least a portion of the opaque section of the configuration region as seen from the rear side. By this embodiment, in the first state a uniform continuous appearance, preferably in the body colour, is visible as seen from the outer side. This is also referred to as a "secret until lit" function. In the second state, a three-dimensionally appearing characteristic feature of the vehicle manufacturer and/or decorative and/or informative elements, such as at least one symbol, a sign, an image or a brand symbol, is back-lit on the visible side and the colouring coating continues to be perceptible as a background.

FIG. 2 shows an illumination system 20 in which, in contrast to the embodiment previously described, a configuration region 2' is produced as a separate plastic plate of a transparent polymer material, a polymethyl methacrylate (PMMA). As an outer covering, there is a cover layer 22 of a transparent plastic material consisting of a polycarbonate. The cover layer 22 comprises an opaque region 24 with a colouring coating and a clear transparent or translucent light window, which is designed in accordance with the light window 8' of the configuration region 2' and correspondingly covers the latter in the mounted situation.

The cover layer 22 comprises a rear-side decoration carrier, which generates the colouring coating in the opaque region.

The configuration region 2' as a separate plastic plate with rear-side laser engraving in order to generate the three-dimensional characteristic features is bonded by means of an optically transparent adhesive 26 onto the rear side of the cover layer 22 in the region of the light window.

The further configuration of the housing element 4, of the lighting means 6 and of the assembly corresponds to the description relating to FIG. 1.

What is claimed is:

1. An Illumination device for a motor vehicle, comprising:
   a transparent light guide made of thermoplastic material, the light guide having a visible side, a rear side, and side faces;
   a plurality of local structures formed on the rear side of the light guide;
   a housing element with a bottom face and side faces, the housing element encloses the rear side and at least a portion of the side faces of the light guide;
   a first color coating provided on the bottom face of the housing element;
   an air gap formed between the color coating on the bottom face of the housing and the rear side of the light guide;
   at least one light source arranged in the housing element, the at least one light source configure to project light into at least one side face of the light guide; and
   a second color coating arranged to cover the at least one light source,
   wherein light from the at least one light source enters the light guide through the side face, and is redirected by the plurality of local structures to exit the light guide through at least a portion of the visible side.

2. The illumination device according to claim 1, wherein the first or second color coating are provided by at least one of a light-transmitting film painting, or a color component.

3. The illumination device according to claim 1, wherein the at least one light source is at least one light emitting diode (LED) or a light strip.

4. The illumination device according to claim 1, wherein the housing element is attached to the motor vehicle or formed integrally with a motor vehicle body element.

5. The illumination device according to claim 1, wherein the visible side of the light guide is configured as a cover element, and the second color coating includes an opaque section concealing the at least one light source.

6. The illumination device according to claim 5, wherein the color coatings are selected to match a body color of the motor vehicle.

7. The illumination device according to claim 1, further comprising:
- a plastic cover layer provided over the visible side of the light guide, the cover layer having an opaque region with a third color coating covering the at least one light source, and a clear transparent or translucent light window arranged to correspond with the visible side of the light guide;
- a transparent optical adhesive fixing the cover layer to at least a portion of the light guide.

8. The illumination device according to claim 7, wherein the color coatings are selected to match a body color of the motor vehicle.

9. An illumination device for a motor vehicle, comprising:
- a cover element made of thermoplastic material, the cover element having a visible side, a rear side, and a side wall;
- a plurality of local structures formed in the thermoplastic material of the cover element;
- a housing element with a bottom face and a side face, the housing element enclosing the rear side and at least a portion of the side wall of the cover element;
- a first color coating provided on the bottom face of the housing element;
- an air gap formed between the bottom face of the housing element and the rear side of the cover element; and
- at least one light source arranged in the housing element, the at least one light source configured to project light into the side wall of the cover element; and
- a second color coating arranged to cover the at least one light source,
- wherein light from the at least one light source enters the cover element through the side wall, and is redirected by the plurality of local structures to exit the cover element through at least a portion of the visible side.

10. A motor vehicle comprising the illumination device according to claim 9, wherein a color of the first coating matches a body color of the motor vehicle.

11. A motor vehicle comprising the illumination device according to claim 9, wherein a color of the first and second coatings match a body color of the motor vehicle.

12. The illumination device according to claim 9, wherein the cover elements has an outer portion and an inner portion surrounded by the outer portion, further including an outer coating provided on the outer portion, the outer coating being opaque.

13. The illumination device according to claim 12, wherein the inner portion defines a clear transparent or translucent light window.

14. The illumination device according to claim 9, wherein the cover element includes a first layer bonded to a second layer, the first layer forming the visible side and the second layer forming the side wall and the rear side, the plurality of local structures are formed in the second layer.

15. The illumination device according to claim 14, wherein the first layer is devoid of the plurality of local structures.

16. The illumination device according to claim 14, wherein the first layer has an opaque outer portion and a transparent inner portion surrounded by the opaque outer portion, and wherein the second layer is transparent.

17. The illumination device according to claim 9, wherein the visible side of the cover element is smooth and devoid of the plurality of local structures.

18. The illumination device according to claim 17, wherein at least some of the plurality of local structures are formed between the visible side and the rear side of the cover element.

19. The illumination device according to claim 18, wherein at least some of the plurality of local structures are formed on the rear side of the cover element.

* * * * *